United States Patent
Marie et al.

(10) Patent No.: US 11,463,329 B2
(45) Date of Patent: Oct. 4, 2022

(54) METHOD FOR USING AN EXTENDED WORKSTATION, AND AN ASSOCIATED SYSTEM FOR USING AN EXTENDED WORKSTATION

(71) Applicant: Orange, Issy-les-Moulineaux (FR)

(72) Inventors: Tiphaine Marie, Saint Contest (FR); Alpha-Oumar Diallo, Caen (FR)

(73) Assignee: ORANGE, Issy-les-Moulineaux (FR)

( * ) Notice: Subject to any disclaimer, the term of this patent is extended or adjusted under 35 U.S.C. 154(b) by 116 days.

(21) Appl. No.: 15/844,003

(22) Filed: Dec. 15, 2017

(65) Prior Publication Data
US 2018/0176100 A1    Jun. 21, 2018

(30) Foreign Application Priority Data
Dec. 16, 2016   (FR) ...................................... 1662655

(51) Int. Cl.
     *G06F 15/16*      (2006.01)
     *H04L 41/5051*      (2022.01)
     (Continued)

(52) U.S. Cl.
     CPC .......... *H04L 41/5051* (2013.01); *G06F 13/12* (2013.01); *H04L 41/5058* (2013.01); *H04L 67/52* (2022.05); *H04W 4/80* (2018.02)

(58) Field of Classification Search
     CPC . H04L 41/5051; H04L 41/5058; H04L 67/18; G06F 13/12; H04W 4/80; H04W 4/08; H04W 4/02

(Continued)

(56) References Cited

U.S. PATENT DOCUMENTS

| | | | | |
|---|---|---|---|---|
| 7,987,269 B1 * | 7/2011 | Mayhead | ............... | G06Q 10/06 709/226 |
| 8,294,747 B1 * | 10/2012 | Weinberg | ............... | H04N 7/148 348/14.01 |

(Continued)

FOREIGN PATENT DOCUMENTS

FR      3030990 A1      6/2016

OTHER PUBLICATIONS

French Search Report dated Sep. 1, 2017 for corresponding French Application No. 1662655, filed Dec. 16, 2016.

(Continued)

*Primary Examiner* — Vivek Srivastava
*Assistant Examiner* — Karina J Garcia-Ching
(74) *Attorney, Agent, or Firm* — David D. Brush; Westman, Champlin & Koehler, P.A.

(57) ABSTRACT

A method is provided for using an extended workstation. The method includes: determining a first object and a second object suitable for being used by a user, the extended workstation including each object determined during the step of determining the first object and the second object; determining a technical resource of the second object and determining an access giving access to the resource enabling the resource to be used; storing in a server an identifier of the determined technical resource in association with an identifier of the second object and an identifier of the access for accessing the resource; and using the technical resource by the first object via the access giving access to the resource.

13 Claims, 10 Drawing Sheets

(51) Int. Cl.
*G06F 13/12* (2006.01)
*H04L 67/52* (2022.01)
*H04L 41/50* (2022.01)
*H04W 4/80* (2018.01)

(58) Field of Classification Search
USPC ........................................................ 709/204
See application file for complete search history.

(56) References Cited

U.S. PATENT DOCUMENTS

| | | | | |
|---|---|---|---|---|
| 9,053,243 | B2* | 6/2015 | Townsend | G06F 13/385 |
| 10,187,455 | B2* | 1/2019 | Jiang | H04W 4/023 |
| 10,231,128 | B1* | 3/2019 | Ziraknejad | H04L 9/0825 |
| 2012/0021776 | A1* | 1/2012 | Phillips | G06Q 30/0282 |
| | | | | 455/456.3 |
| 2013/0097171 | A1* | 4/2013 | Weksler | G06F 16/44 |
| | | | | 707/740 |
| 2013/0324169 | A1* | 12/2013 | Kamal | H04W 4/80 |
| | | | | 455/466 |
| 2013/0329738 | A1* | 12/2013 | Yamagata | H04L 63/08 |
| | | | | 370/392 |
| 2014/0006597 | A1* | 1/2014 | Ganguli | H04L 67/1014 |
| | | | | 709/224 |
| 2014/0237125 | A1* | 8/2014 | Zhou | H04W 76/10 |
| | | | | 709/227 |
| 2014/0379801 | A1* | 12/2014 | Gupta | H04L 67/306 |
| | | | | 709/204 |
| 2015/0040198 | A1* | 2/2015 | Gopalakrishnan | |
| | | | | H04L 63/0492 |
| | | | | 726/5 |
| 2015/0095322 | A1* | 4/2015 | Procopio | G06Q 30/0631 |
| | | | | 707/723 |
| 2015/0365457 | A1* | 12/2015 | Dvir | H04L 61/1541 |
| | | | | 709/219 |
| 2016/0088064 | A1* | 3/2016 | Chen | H04W 4/60 |
| | | | | 709/204 |
| 2016/0105375 | A1* | 4/2016 | Hernandez | G06F 21/445 |
| | | | | 709/226 |
| 2017/0126512 | A1* | 5/2017 | Seed | G06F 9/5072 |
| 2017/0279903 | A1* | 9/2017 | Mimassi | H04L 67/306 |

OTHER PUBLICATIONS

French Written Opinion and Search Report dated Sep. 1, 2017 for corresponding French Application No. 1662655, filed Dec. 16, 2016.

* cited by examiner

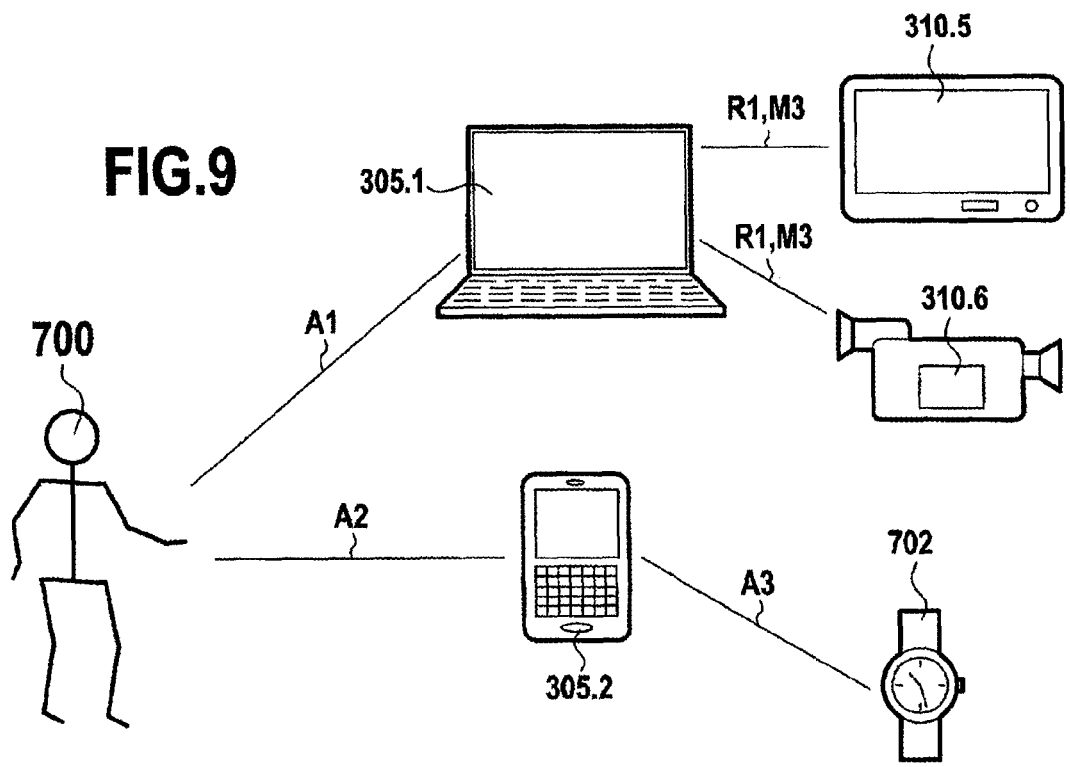
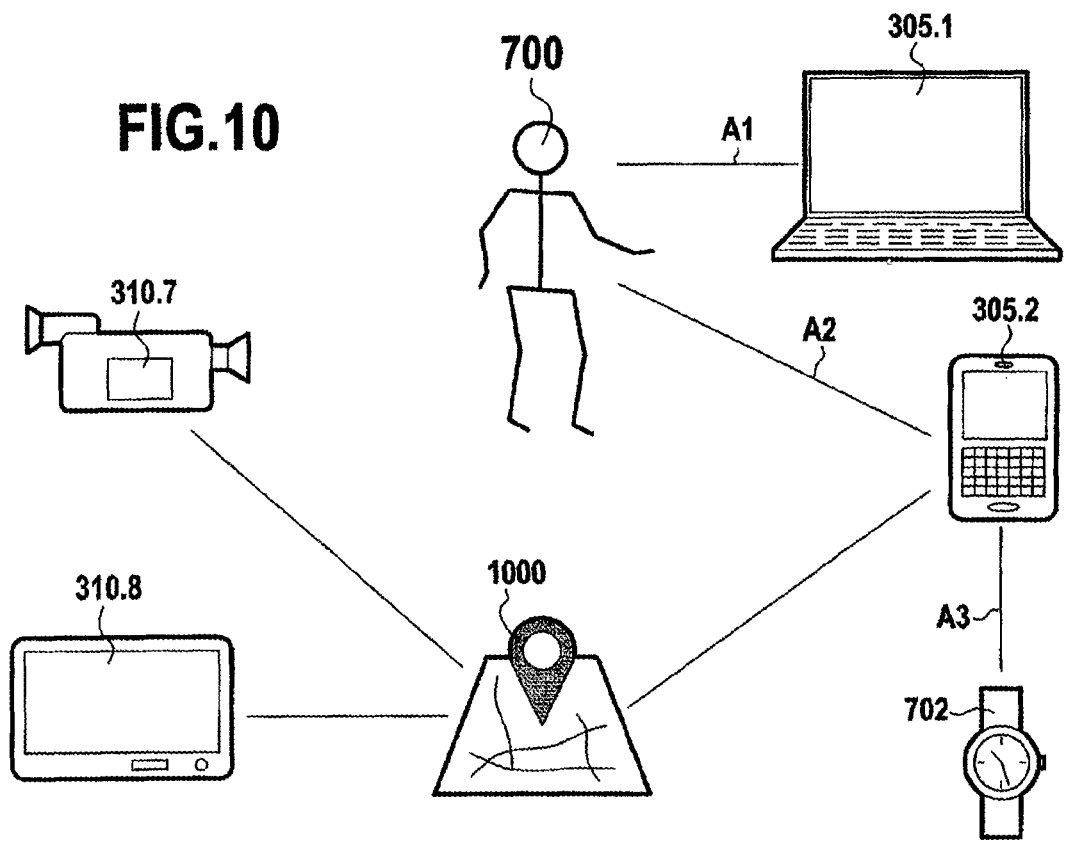

| object identifier | object type | private/ public | hardware capacities | interaction capacities | software capacities | communication capacities |
|---|---|---|---|---|---|---|
| 1 | PC | private | screen/resolution/size | keyboard | browser | wifi |
| | | | mike | mouse | office | bluetooth |
| | | | camera | touch | coopnet client | wired |
| | | | loud speakers | | OVP client | |
| 2 | smartphone | private | screen/resolution/size | touch | browser | wifi |
| | | | mike | | OVP app | bluetooth |
| | | | camera | | other apps | airdrop |
| | | | loud speakers | | | lifi |
| 3 | smartwatch | private | screen/resolution/size | touch | OVP app | wifi |
| | | | mike | knob | other apps | bluetooth with paired smartphone |
| | | | | | | |
| 4 | OVP system | public | screen/resolution/size | remote control | OVP | wired |
| | | | mike | | | |
| | | | camera | | | |
| | | | loud speakers | | | |

FIG.11

FIG.12

| object identifier | object type | private/public | resource id | resource description | capacity type | technical description |
|---|---|---|---|---|---|---|
| 1 | PC | private | 1 | screen | hardware | |
| | | | 2 | mike | hardware | |
| | | | 3 | camera | hardware | |
| | | | 4 | loud speakers | hardware | |
| | | | 5 | keyboard | interaction | |
| | | | 6 | mouse | interaction | |
| | | | 7 | touch | interaction | |
| | | | 8 | browser | software | |
| | | | 9 | office | software | |
| | | | 10 | coopnet client | software | |
| | | | 11 | OVP client | software | |
| | | | 12 | wifi | communication | |
| | | | 13 | bluetooth | communication | |
| | | | 14 | wired | communication | |

| hardware capacities | priority | |
|---|---|---|
| screen | PC | high resolution/ large size |
| | smartphone | high resolution/ small size |
| | smartwatch | very small size |
| mike | PC | spatial sound mike |
| | smartphone | good quality mike/ can be moved |
| | watch | medium quality mike/ can be moved |
| | loud speakers | |
| interaction capacity | priority | |
| touch | smartphone | |
| | watch | |
| voice | smartphone | |
| | watch | |
| | PC | |

FIG. 13

METHOD FOR USING AN EXTENDED WORKSTATION, AND AN ASSOCIATED SYSTEM FOR USING AN EXTENDED WORKSTATION

BACKGROUND OF THE INVENTION

The present invention relates to the field of computer workstations, and it relates more particularly to a method and to a system for using an extended workstation, and also to a method and a system for creating an extended workstation.

A computer workstation comprises objects that are made available to a user in a predetermined zone so that the user can perform a task by means of these objects.

By way of example, the objects are terminals or peripherals, with each object having one or more resources. These objects may be public or private.

A public object is an object that is not of a personal nature and that may be made available to a plurality of people, such as a printer, a projection screen, etc.

A private object is personal and thus available to only one person. Thus, by way of example, a private object is a mobile telephone, a smartwatch, a personal computer (PC), etc.

As shown in FIG. 1, and in known manner, an employee may make use of various public or private objects 100 in a work environment.

Each object 100 has one or more technical resources, and at least one service 110 making it possible to use one or more resources.

The term "service" is used to mean a software module, e.g. an application, that comprises all of the service logic that is specific to the type of the object 100 and that is associated with at least one technical resource. The service logic is the resource execution automaton of the object 100, in other words the various operations performed by the object 100 in order to manage the resource.

By way of example, a mobile telephone of the smartphone type includes, amongst its numerous resources, a microphone enabling an audio stream to be picked up, and a service enabling the stream to be controlled, typically by processing requests of the "on/off" type that are spoken to the microphone, and to implement mechanisms for audio processing (codecs, echo cancellers, etc.).

The service is developed for the type of the object 100 on the basis of application programming interfaces (APIs) 120, these APIs 120 being made available by a service brick 130.

The service may also enable the object 100 to be connected to the service brick by means of an API.

For example, a video conference service brick may include a plurality of APIs enabling this service brick to be used. For each type of object, an application using such APIs may be developed.

Thus, a smartphone type mobile telephone can include a video conference application that enables the mobile telephone to be connected in audio and video via a conference bridge by means of the microphone and the camera of the mobile telephone. Furthermore, a personal computer may include a web access service enabling the personal computer to be connected in audio and video via a conference bridge using a microphone and a camera of the personal computer.

Nevertheless, using a video conference is complicated since it requires a video conference application to be installed on each object.

OBJECT AND SUMMARY OF THE INVENTION

The present invention provides a method for using an extended workstation, the method comprising:

a step of determining a first object and a second object suitable for being used by a user, the extended workstation comprising each object determined during the step of determining the first object and the second object;

a step of determining a technical resource of the second object and of determining access means giving access to said resource enabling said resource to be used;

a step of storing in a server an identifier of the determined technical resource in association with an identifier of the second object and an identifier of said access means for accessing said resource; and a step of using the technical resource by the first object via the access means giving access to said resource.

Thus, the invention makes it possible not to install, on each object and for each resource, a specific service enabling said resource to be controlled (e.g. a video conference service). Specifically, the invention makes it possible to use a service that is installed on only one object of the extended workstation, and it enables one or more resources of one or more objects of the extended workstation to be controlled.

The invention makes it possible to simplify implementing the service by enabling the resources of each object of the extended workstation to be made use of in automatic manner from an object of the extended workstation.

In addition, in order to implement a service, the invention makes it possible to use a resource of an object made available to a user in a predetermined zone, the object not being specifically intended for implementing the service. This makes it possible to avoid equipping a zone, such as a conference room, with objects that are dedicated to implementing the service. Thus, by way of example, the microphone of a mobile telephone may be used in a video conference room, thus making it possible to avoid purchasing dedicated microphones and installing them in the room.

In a particular embodiment, the step of determining the first object and the second object comprises:

a substep of detecting activity of the first object; and/or a substep of detecting activity of the second object.

These substeps make it possible in real time to have knowledge about one or more objects within reach of the user and available, i.e. suitable for being used by the user.

In a particular implementation, the step of determining the first object and the second object comprises:

a substep of detecting the entry of the first object into a predefined zone, the first object then being determined as being an object suitable for being used by a user; and/or a substep of detecting the entry of the second object into a predefined zone, the second object then being determined as being an object suitable for being used by a user.

These substeps make it possible in real time to have knowledge about one or more objects within reach of the user and situated in a zone such as an office or a meeting room.

In a particular implementation, the determination step of determining the first object and the second object comprises:

a substep of detecting the second object by the first object, the second object then being determined as being an object suitable for being used by a user; and/or a substep of detecting the first object by the second object, said first object then being determined as being an object suitable for being used by a user.

It is thus possible to determine all of the objects in the proximity of the user and accessible to the user at an instant t. By way of example, these objects are the objects present in a room such as an office, a meeting room, or a conference room, and that are accessible to the user when the user is in that room.

In a particular implementation, the step of determining a technical resource of the second object includes a substep of searching for a technical resource by the second object.

In a particular implementation, the technical resource is:
a communication resource;
a software resource;
a hardware resource; or
an interaction resource.

In a particular implementation, the at least one access means is an IP address of the second object including the resource and a port address associated with the resource enabling the resource to be used.

In a particular implementation, the step of using includes a substep of recommending the determined technical resource.

In a particular implementation, the step of using comprises:
a substep of the first object receiving the association stored in the step of storing as sent by the server; and
a substep of selecting the determined technical resource.

In a particular implementation, the step a using comprises a substep of associating a service platform with the selected technical resource.

The invention also provides a system for using an extended workstation, which system is suitable for implementing a method for using an extended workstation as described above.

In a particular embodiment, the various steps of the method of the invention for using an extended workstation are determined by computer program instructions.

Consequently, the invention also provides a computer program on a data medium, the program including instructions adapted to implementing a portion of the steps of a method of the invention for using an extended workstation.

The program may use any programming language and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a hard disk.

Furthermore, the data medium may be a transmissible medium such as an electrical or optical signal that may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

Furthermore, the invention provides a method for creating an extended workstation, the method comprising:
a step of determining a first object and a second object suitable for being used by a user, the extended workstation comprising each object determined during the step of determining the first object and the second object;
a step of determining a technical resource of the second object and of determining access means giving access to said resource enabling said resource to be used; and
a step of storing in a server an identifier of the determined technical resource in association with an identifier of the second object and an identifier of said access means for accessing said resource.

In addition, the invention provides a system for creating an extended workstation suitable for performing a method as described above for creating an extended workstation.

BRIEF DESCRIPTION OF THE DRAWINGS

Other characteristics and advantages of the present invention appear from the following description made with reference to the accompanying drawings, which show an embodiment having no limiting character. In the figures:

FIGS. 7 to 10 schematically represent objects that are determined in steps of determining of methods for using an extended workstation in implementations of the invention;

FIGS. 11 and 12 schematically represent a list and part of a list obtained after steps of storing of methods for using an extended workstation in implementations of the invention;

FIG. 13 schematically represents the classification obtained in a substep of classifying of a method for using an extended workstation in an implementation of the invention;

DETAILED DESCRIPTION OF EMBODIMENTS

The present invention relates to the field of computer workstations, and it relates more particularly to a method and to a system for using an extended workstation, and also to a method and a system for creating an extended workstation.

A computer workstation comprises objects that are made available to a user in a determined zone so that the user can perform a task by means of these objects.

By way of example, the objects are terminals or peripherals. These objects may be public or private.

A public object is a terminal or a peripheral that is not of a personal nature and that may be made available to a plurality of people, such as a printer, a projection screen, etc.

A private object is personal and is thus made available to only one person. Thus, by way of example, a private object is a mobile telephone, a smartwatch, a personal computer (PC), etc.

Figure 1:
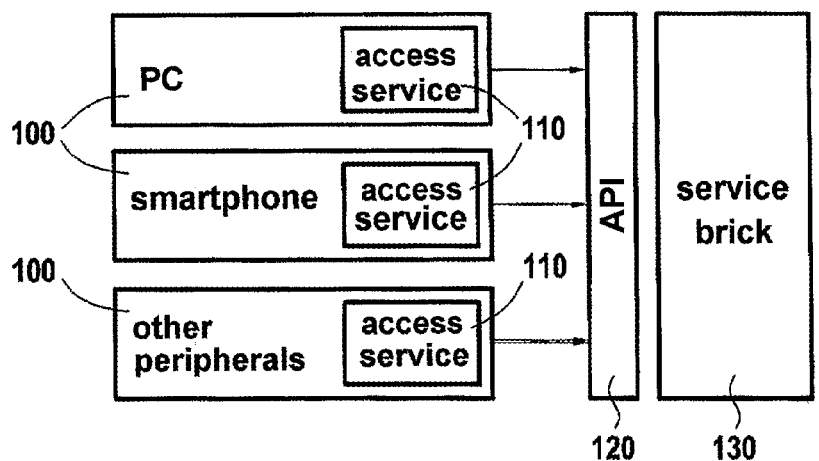
FIG. 1 schematically represents a workstation of the art prior to the invention.
Figure 2:
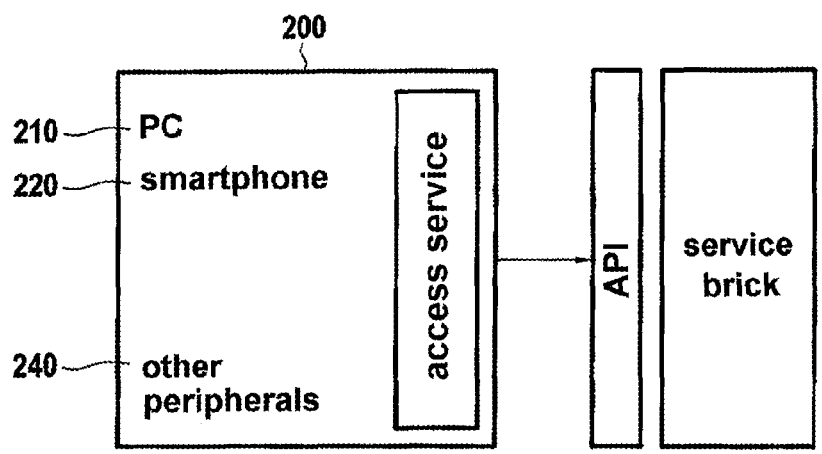
FIG. 2 schematically represents an extended workstation created by a method in an implementation of the invention.

FIG. 2 schematically represents an extended workstation 200 created by a method in an implementation of the invention.

At an instant t, a user enters a meeting room with a personal computer 210 and a personal mobile telephone 220 of the smartphone type. The meeting room has other objects 240, e.g. a camera and a screen.

The extended workstation 200 then automatically comprises in almost instantaneous manner the personal computer 210, the mobile telephone 220, and the objects 240 in the meeting room.

As shown in FIG. 2, the invention makes it possible to avoid installing a specific service on each object and for each resource for the purpose of controlling said resource (e.g. a video conference service). Specifically, the invention makes it possible to use a service installed on only one object of the extended workstation and makes it possible to control one or more resources of one or more terminals 210, 220, 240 of the extended workstation 200. For this purpose, an application serving to make one or more resources available is installed on the object having one or more resources that might be controlled by another object.

In an example, the service is a video conference service and it is installed on the personal computer 210. The user can then run the video conference service from the personal computer 210, and:
- the camera and the screen can be used from the personal computer 210 in order to pick up and display media streams;
- the personal computer 210, which gives easy access to shared spaces and documents, and which makes it possible to produce content and to display it, may be used for sharing a document; and
- the microphone of the mobile telephone 220 can be used from the personal computer 210 to pick up the audio stream, and the screen of the mobile telephone 220 can be used from the personal computer 210 to display a list of participants.

In another example, the service is a communications system between people or a more global workstation service.

The invention makes it possible to simplify implementing the service, by making it possible to make use of the resources of each object in the extended workstation in automatic manner from an object of the extended workstation.

In addition, in order to implement a service, the invention makes it possible to use a resource of an object made available to a user in a predetermined zone, which object is not specifically for implementing the service. This makes it possible to avoid providing a zone, such as a conference room, with objects that are dedicated to implementing the service. Thus, by way of example, the microphone of a mobile telephone can be used in a video conference room, thereby making it possible to avoid purchasing dedicated microphones and installing them in the room.

Figure 3:
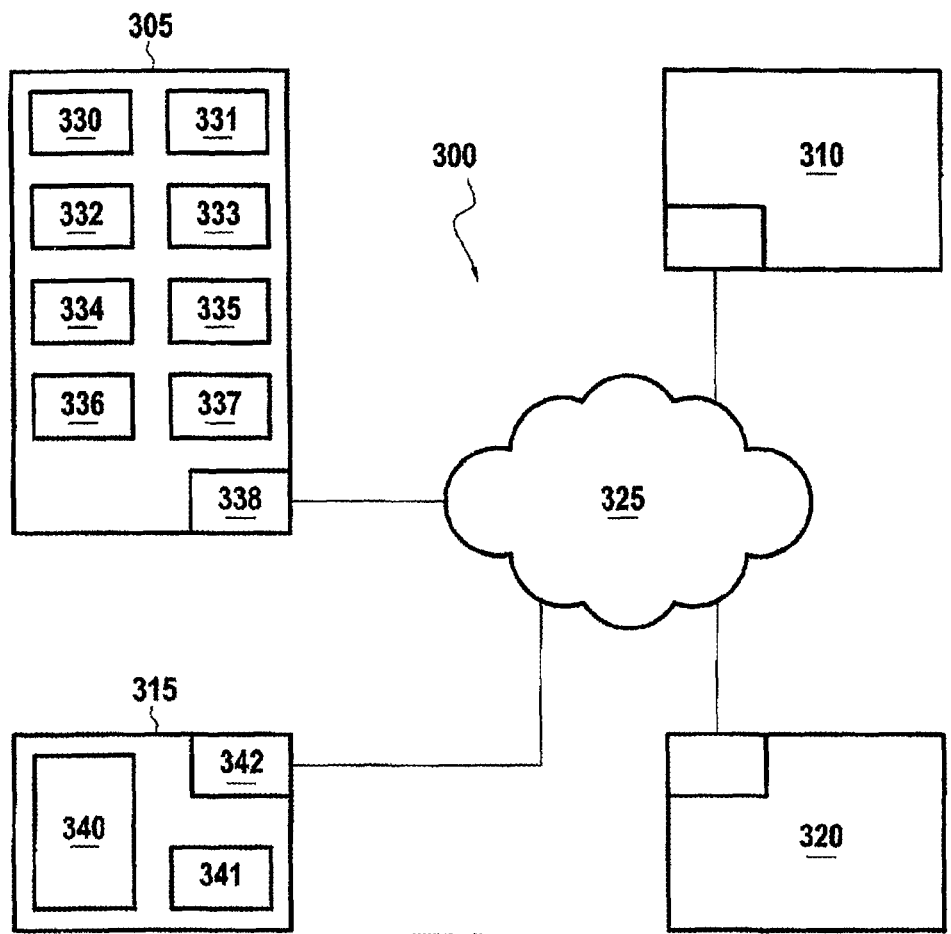
FIG. 3 schematically represents a system for using an extended workstation in an embodiment of the invention.

FIG. 3 schematically represents a system 300 for using an extended workstation in an embodiment of the invention.

The system 300 comprises a first object 305, a second object 310, a server 315, and a service platform 320 that are connected to a telecommunications network 325.

By way of example, the telecommunications network 325 is a local network. Nevertheless, this assumption is not limiting and other telecommunications networks can be used, such as the public Internet or a proprietary network. In addition, no limitation is associated with the way in which the entities 305, 310, 315, and 320 are connected to the network 325: they may be connected thereto in wired or wireless manner, using a mobile or a fixed access network, etc.

In a variant, each entity 305, 310, 315, and 320 may be connected to a plurality of telecommunications networks. In an example, it is thus possible for the first object 305 to communicate with the second object 310 via a first telecommunications network, and to communicate with the server 315 via a second telecommunications network.

Nor is any limitation associated with the natures of the objects 305 and 310. Each object 305, 310 may thus be a keyboard, a printer, a screen, a smartwatch, a terminal, e.g. a mobile terminal such as a mobile telephone or a personal computer, etc. In addition, each object 305, 310 may be public or private.

The first object 305 may include an activity detection module 330 for detecting activity of the first object 305, a zone detection module 331, an object detection module 332, a resource search module 333, a recommendation module 334, a selector module 335, a utilization module 336, a disconnection module 337, and/or a communication module 338. The modules 330, 331, 332, 333, 334, 335, 336, 337, and/or 338 may be grouped together in an application installed in the first object 305.

The server 315 has a list 340 associated with the extended workstation, a management module 341 for managing the list 340, and/or a communication module 342. By way of example, the list 340 is stored in a cache memory, or in a database.

The communication modules 338 and 342 may include one or more long-range communication submodules, such as for example a WiFi submodule, and/or one or more short-range communication submodules, such as a near field communication (NFC) module or a Bluetooth™ wireless technology module.

In an example, the second object 310 comprises the same modules 330-338 as the first object 305. In a variant, the second object 310 comprises one or more modules that are substantially identical to the modules 330-338 of the first object 305.

In another embodiment of the invention (not shown), the system 300 does not include a server. The first object 305 then includes the list 340 and the management module 341 for managing the list 340.

In another embodiment of the invention (not shown) that may be combined with the above-mentioned example without a server, the system 300 does not include a service platform.

In an example, the modules 330, 331, 332, 338, 341, and/or 342 form a determination module for determining a first object and a second object, suitable for being used by a user.

Furthermore, the modules 333, 338, 341, and/or 342 form a determination module for determining a technical resource of the second object together with access means for accessing the resource to enable the resource to be used.

The module 341 forms a storage module in a server for storing an identifier of the determined technical resource in association with an identifier of the second object and an identifier of said resource access means.

Furthermore, the modules 334, 335, 336, 337, 338, 341, and/or 342 form a module enabling the first object to use the technical resource via the access means giving access to said resource.

Figures 4A, 4B, 5:
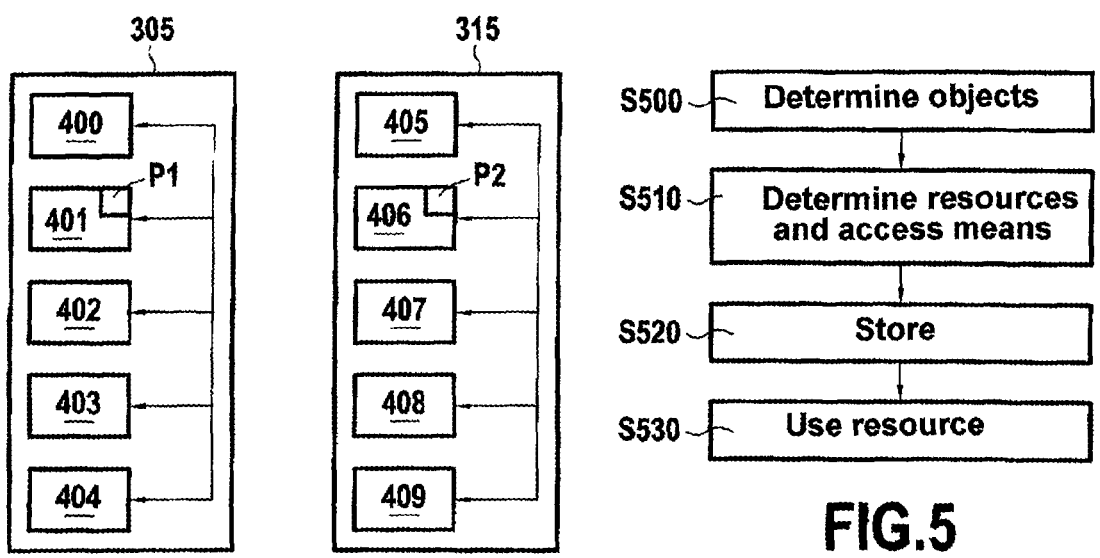
FIG. 4A schematically represents a first object of a system for using an extended workstation in an embodiment of the invention.
FIG. 4B schematically represents a server of a system for using an extended workstation in an embodiment of the invention.
FIG. 5 is a flow chart showing the main steps of a method for using an extended workstation in an implementation of the invention.

As shown in FIG. 4A, the first object 305 presents the conventional architecture of a computer. The first object 305 includes in particular a processor 400, a ROM 401, a rewritable non-volatile memory 402 (which may be of the flash NAND or of the electrically erasable programmable read only memory (EEPROM) type, for example), a rewritable volatile memory or "random access memory" (RAM) 403, and a communication interface 404.

The ROM 401 of the first object 305 constitutes a data medium constituting an embodiment of the invention that is readable by the processor 400 and that stores a first computer program P1 constituting an embodiment of the invention. In a variant, the first computer program P1 is stored in the rewritable non-volatile memory 402.

In this example, the first computer program P1 defines functional and software modules that are configured to implement the steps of a method for using according to an implementation of the invention (when the system 300 does not include a server) or some of those steps (when the system 300 includes the server 315). These functional modules rely on or control the above-mentioned hardware elements 400, 401, 402, 403, and 404 of the first object 305. In this example, and as shown in FIG. 3, they comprise in particular the activity detection module 330, the zone detection module 331, the object detection module 332, the resource search module 333, the recommendation module 334, the selector module 335, the utilization module 336, the disconnection module 337, and/or the communication module 338. When the system 300 does not include a server, they may also include the management module 341.

The functions of these various modules are described in greater detail below with reference to the steps of the method described with reference to FIG. 6.

The second object 310 may have the same architecture as the first object 305, comprising in particular a processor, a ROM, a rewritable non-volatile memory, a rewritable volatile memory, and a communication interface.

In addition, as shown in FIG. 4B, the server 315 may also present the conventional architecture of a computer, comprising in particular a processor 405, a ROM 406, a rewritable non-volatile memory 407, a rewritable volatile memory 408, and a communication interface 409.

The ROM 406 or the rewritable non-volatile memory 407 of the server 315 constitutes a data medium forming an embodiment of the invention that is readable by the processor 405 and that stores a second computer program P2 forming an embodiment of the invention.

In this example, the second computer program P2 defines functional and software modules configured to implement some of the steps of a method for using according to an implementation of the invention. These functional modules rely on or control the above-mentioned hardware elements 405, 406, 407, 408, and 409 of the server 315. In this example, and as shown in FIG. 3, they comprise in particular the management module 341.

FIG. 5 shows a method for using an extended workstation in an implementation of the invention.

The method is performed by a system for using an extended workstation, e.g. the system 300 described with reference to FIG. 3.

In a step S500, a first object 305 and a second object 310 suitable for being used by a user are determined, the extended workstation comprising each of the objects 305, 310 as determined during the step S500.

Thus, the step S500 makes it possible to determine all of the objects 305, 310 that are in the proximity of the user and accessible to the user at an instant t. By way of example, these objects are the objects present in a room such as an office, a meeting room, or a conference room, and accessible to the user when the user is in that room.

In a step S510, a technical resource of the second object 310, as determined in step S500, together with resource access means enabling said resource to be used are determined.

In a step S520, an identifier of the determined technical resource is stored in a server 315 in association with an identifier of the second object 310.

In a step S530, the technical resource determined in step S510 is used by the first object 305 via the access means giving access to said resource.

Figure 6:
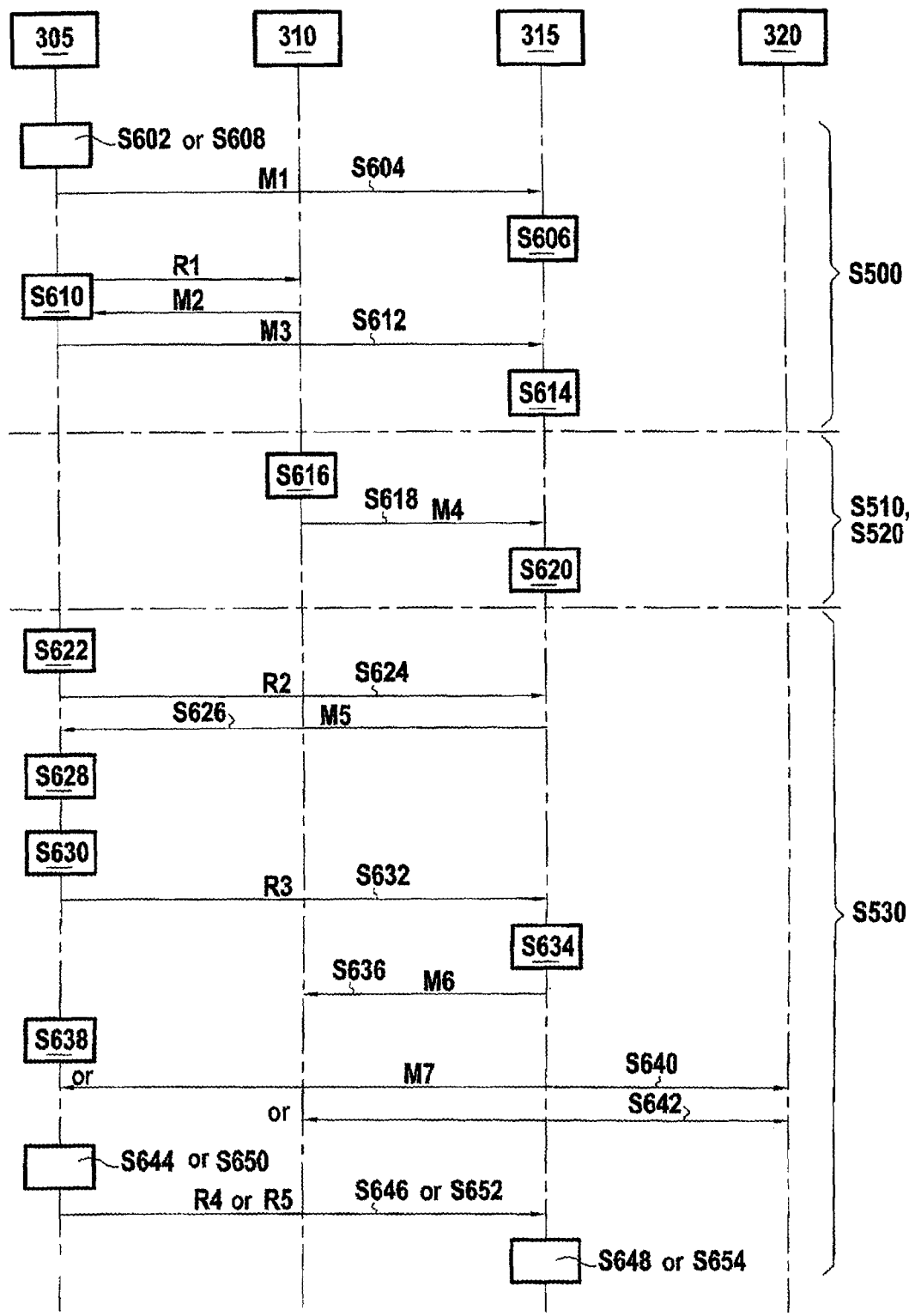
FIG. 6 is a flow chart showing the main steps of a method for using an extended workstation in an implementation of the invention.

FIG. 6 shows a method for using an extended workstation in an implementation of the invention.

The method is implemented by a system for using an extended workstation, e.g. the system 300 described with reference to FIG. 3.

In a step S500, a first object 305 and a second object 310 suitable for being used by a user are determined, the extended workstation comprising each of the objects 305, 310 determined during the step S500.

The step S500 may include a substep S602 of detecting activity of the first object 305, performed by an activity detection module, typically the activity detection module 330 of the first object 305 of FIG. 3.

The detected activity may be interaction activity when the user interacts with the first object 305, typically via a man-machine interface such as a mouse, a keyboard, a touch screen, or a knob.

The detected activity may be communication activity when the user communicates with another user by means of the first object 305, e.g. by telephoning or by sending a message or by video conference.

The detected activity may be data exchange activity when the first object 305 communicates with another object, typically by sending requests or messages via a short-range network.

Other types of activity may also be detected during this substep S602 of detecting an activity.

When the activity detection module 330 detects an activity, the first object 305 can then send (in substep S604) a message M1 to a server, typically the server 315 of FIG. 3.

The message M1 indicates that an activity has been detected, and thus that the first object 305 is suitable for being used by the user. By way of example, the message M1 may be sent in real time.

The message M1 may include an identifier of the user and an identifier of the first object 305 when the detected activity is interaction activity or communication activity, or the identifier of the first object 305 and an identifier of another object when the activity is data exchange activity, or indeed only an identifier of the first object 305.

The message M1 may also include a request for connection to the server 315, e.g. requesting that a data exchange channel be opened with the server 315.

The management module 341 of the server 315 creates or updates the list 340 corresponding to the extended workstation (substep S606) by associating the identifier of the first object 305 with the identifier of the user and/or with the identifier of the other object, or by inputting the identifier of the first object 305.

In addition, the data exchange channel between the first object 305 and the server 315 may be set up.

In addition, the step S500 may include a substep of detecting activity of the second object 310 that is performed by an activity detection module of the second object 310, being implemented in the same manner as substep S602. Substeps S604 and S606 can then be implemented for the second object 310.

One or more first objects 305 and/or one or more second objects 310 can thus be discovered, with the list 340 being created or updated accordingly. Specifically, the substep S602 of detecting activity may be implemented several times by different objects 305, 310. The substep S602 of detecting activity may also serve to detect a plurality of activities in a single object 305, 310.

Thus, when the system has a plurality of objects 305, 310, each object 305, 310 may implement one or more substeps S602 and/or one or more substeps S604. The server 315 can then perform the substep S606 one or more times.

Figure 7:
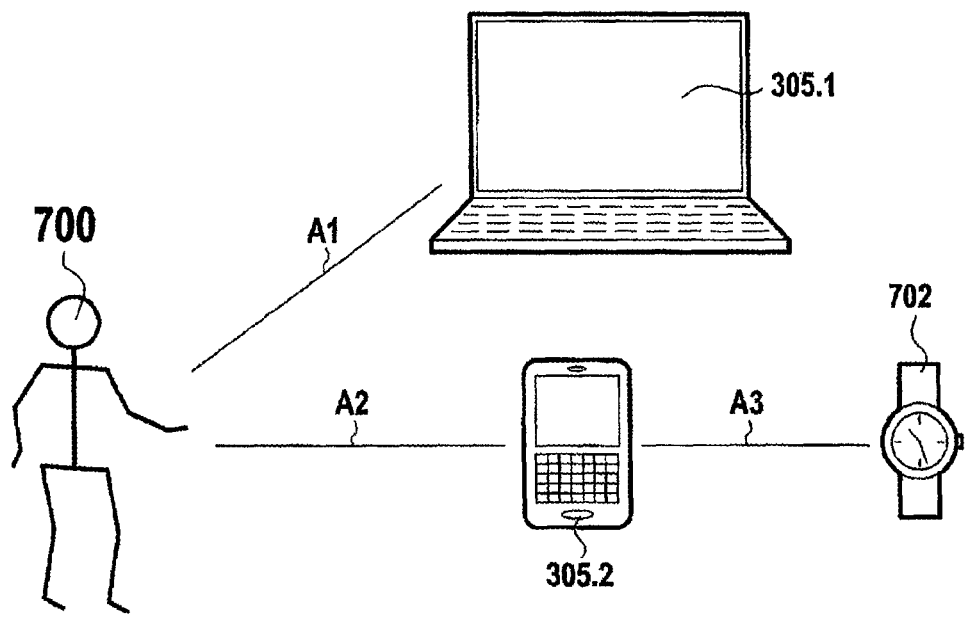

FIG. 7 schematically represents a personal computer 305.1 and a mobile telephone 305.2 having activity that is detected in substep S602. In this example, the personal computer 305.1 detects interaction activity A1 with a user 700 acting on the mouse and/or the keyboard of the personal computer 305.1. In addition, the mobile telephone 305.2 detects communication activity A2 by the user 700 and data exchange activity A3 with a smartwatch 702, typically via a short-range network. The list 340 may then include a link between the identifier of the user and the identifier of the personal computer 305.1, a link between the identifier of the user and the identifier of the mobile telephone 305.2, and a link between the identifier of the mobile telephone 305.2 and the identifier of the smartwatch 702.

The substeps S602, S604, and S606 thus make it possible in real time to have knowledge about one or more objects 305, 310 within reach of the user and available, i.e. suitable for being used by the user. This or these objects 305, 310 constitute a first portion of the extended workstation.

When the system 300 does not include a server, the substeps S604 and S606 are not performed and it is a management module 341 of one of the objects 305, 310 that creates and updates the list 340 as a function of the activity detected by the activity detection module 330, or as a function of information coming from at least one message received by the object 305, 310, which message was sent by another object 305, 310 that has performed the substep S602.

A substep S608 of detecting the entry of the first object 305 into a predefined zone may be performed. This substep then replaces the substep S602 or is additional to the substep S602, the first object 305 being determined as being an object suitable for being used by a user.

The detection of the entry of the first object 305 into a zone is performed by a zone detection module of the first object, typically the zone detection module 331 of the first object 305 in FIG. 3, e.g. when the user of the first object 305 enters into the zone together with the first object 305.

By way of example, the predefined zone is a meeting room, a conference room, an office, etc.

The zone detection module 331 is suitable for detecting a predetermined zone by geolocation, by detecting an accessible network (e.g. a local WiFi network), by detecting an NFC tag, or by any other proximity detection technique.

The message M1 sent in substep S604 may then include an identifier of the first object 305 and an identifier of the detected zone. Thus the list 340 is created or updated (substep S606) by associating the identifier of the first object 305 with the identifier of the detected zone, possibly in addition to the identifier of the first object 305 associated with the identifier of the user and/or the identifier of the other object.

Likewise, a substep of detecting the entry of the second object 310 into a predefined zone may be performed. This substep then replaces the substep of detecting activity of the second object 310 or is additional to that substep, the second object 310 then being detected as being an object that is suitable for being used by a user.

Detection of the second object 310 entering into a zone is performed by the zone detection module of the second object 310 and it is implemented in the same manner as the substep S608.

The substeps of detecting an object 305, 310 entering into a zone make it possible to know that the user and the object 305, 310 have entered the zone and are thus in the proximity of other objects present in the zone.

The step S500 of determining a first object 305 and a second object 310 may also include a substep S610 of detecting the second object by the first object, the second object then being determined as being an object suitable for being used by a user.

The second object may be detected by an object detection module of the first object, e.g. the object detection module 332 of the first object 305. By way of example, the detected second object is the object 310 of FIG. 3.

The object detection module 332 is suitable for detecting a second object 310 when the first object 305 and the second object 310 can communicate by means of at least one common short-range network, which network is typically a wireless network (WiFi, Bluetooth™, LiFi), or a wired network. By way of example, the short-range network used may be a local WiFi network in a limited zone such as a conference or meeting room.

By way of example, the object detection module 332 sends a search request R1 via each short-range communication submodule of the communication module 338 of the first object 305. When the second object 310 is in the proximity of the first object 305, it receives the search request R1 and sends a presence message M2 to the first object 305.

By way of example, the object detection module 332 may be an application of the "radar" type.

When the object detection module 332 detects a second object 310, the first object 305 can then send (substep S612) a message M3 to the server 315, the message M3 indicating that a second object 310 has been detected, and also that the second object 310 is suitable for being used by the user.

By way of example, the message M3 may be sent in real time. The message may include an identifier of the first object 305 and an identifier of the second object 310.

The management module 341 of the server 315 then updates the list 340 corresponding to the extended workstation, by associating the identifier of the first object 305 with the identifier of the second object 310 on the basis of the information sent (substep S614).

In addition, a data exchange channel may be set up between the second object 310 and the server 315.

The step S500 of determining a first object 305 and a second object 310 may also include a substep of detecting a first object 305 that is performed by another first object 305, a substep of detecting a first object 305 that is performed by a second object 310, and/or a substep of detecting a second object 310 that is performed by another second object 310. These substeps are performed in the same manner as the substep S610.

One or more objects 305, 310 can thus be discovered during implementation of the substep S610, with the list 340 being created or updated accordingly. Specifically, when the system has a plurality of objects 305, 310 one or more of these objects 305, 310 may implement the substep S610. In addition, a plurality of objects 305, 310 may receive a request R1 coming from another object 305, 310 and may send a message M3 in response to the request R1.

The substeps S610, S612 and S614 thus make it possible in real time to have knowledge about one or more objects 305, 310 within reach of the user and available, i.e. suitable for being used by the user. This or these objects 305, 310 constitute a second portion of the extended workstation.

Figure 8:
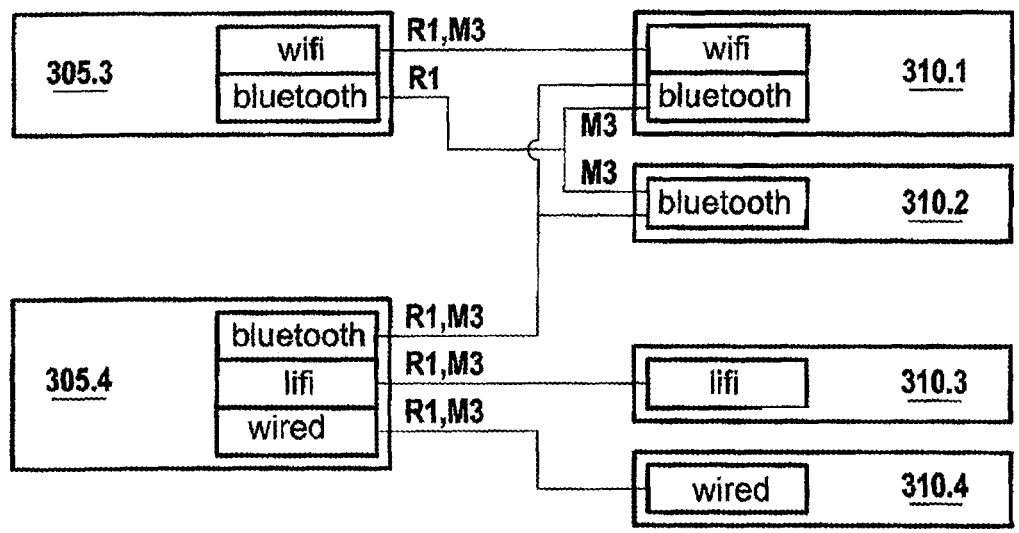

FIG. 8 schematically represents four objects of the "second" object type 310.1, 310.2, 310.3, and 310.4 that have been detected in substeps S610 by two objects of the "first" object type 305.3 and 305.4.

The first object 305.3 has a WiFi communication submodule and a Bluetooth™ communication submodule, the first object 305.4 has a Bluetooth™ communication submodule, a LiFi communication submodule, and a wired communication submodule, the second object 310.1 has a WiFi communication submodule and a Bluetooth™ communication submodule, the second object 310.2 has a Bluetooth™ communication submodule, the second object 310.3 has a LiFi communication submodule, and the second object 310.4 has a wired communication submodule.

The second object 310.1 can thus be detected by means of a request R1 sent by the WiFi communication submodule of the first object 305.3, a request R1 sent by the Bluetooth™ communication submodule of the first object 305.3 and/or a request R1 sent by the Bluetooth™ communication submodule of the first object 305.4, the second object 310.2 can be detected by means of a request R1 sent by the Bluetooth™ communication submodule of the first object 305.3 and/or by means of a request R1 sent by the Bluetooth™ communication submodule of the first object 305.4, the second object 310.3 can be detected by means of a request R1 sent by the LiFi communication submodule of the first object 305.4, and the second object 310.4 can be detected by means of a request R1 sent by the wired communication submodule of the first object 305.4.

FIG. 9 schematically represents a tablet 310.5 and a camera 310.6 detected by the personal computer 305.1 of FIG. 7. The list 340 may then include, in addition to the link between the identifier of the user and the identifier of the personal computer 305.1, the link between the identifier of the user and the identifier of the mobile telephone 305.2, and the link between the identifier of the mobile telephone 305.2 and the identifier of the smartwatch 702, a link between the identifier of the personal computer 305.1 and the identifier of the tablet 310.5, and a link between the identifier of the personal computer 305.1 and the identifier of the camera 310.6.

When the system 100 does not include a server, the substeps S612 and S614 are not performed, and it is a management module 341 of an object 305 that updates the list 340.

In a variant in which the first object 305 is associated with a predefined zone in substep S606, substep S610 of detecting the second object by the first object may be replaced by a substep (not shown) of associating the second object 310 with a predefined zone. By way of example, the substep of associating is performed by a user on installing the second object 310 in the predefined zone. The management module 341 of the server 315 then updates the list 340 by creating a link between the identifier of the second object 310 and the identifier of the predefined zone. When a first object 305 detects (in substep S608) a predefined zone associated with the second object 310 during the substep of associating, it is thus determined that the second object 310 is suitable for being used by the user of the first object 305.

Likewise, the substeps of a first object being detected by another first object, of a first object being detected by a second object, and of a second object being detected by another second object can be replaced by substeps of associating the object with a predefined zone.

FIG. 10 schematically represents a camera 310.7 and a tablet 310.8 that have been associated with a predefined zone 1000. FIG. 10 also shows the personal computer 305.1 and the mobile telephone 305.2 of FIG. 7. The list 340 then includes a link between the identifier of the camera 310.7 and the identifier of the predefined zone 1000, a link between the identifier of the tablet 310.8 and the identifier of the predefined zone, the link between the identifier of the user and the identifier of the personal computer 305.1, the link between the identifier of the user and the identifier of the mobile telephone 305.2, and the link between the identifier of the mobile telephone 305.2 and the identifier of the smartwatch 702.

In this example, the user 700 of the mobile telephone 305.2 in FIG. 7 enters into the predefined zone 1000. The mobile telephone 305.2 then detects the predefined zone 1000 in a substep S608. The list 340 can then include, in addition to the links mentioned in the above paragraph, a link between the identifier of the predefined zone 1000 and the identifier of the mobile telephone 305.2.

In a step S510, a technical resource of the second object 310 and means for accessing the resource enabling the resource to be used, are determined.

The step S510 may include a substep S616 of searching for a technical resource by the second object 310.

The substep S616 of searching for a technical resource may be performed by the resource search module of the second object, e.g. the resource search module 333 of the second object 330 of FIG. 3. Furthermore, the substep S616 may be performed by a plurality of different second objects 310, e.g. by each second object 310. For each second object 310 performing the substep S616, one or more resources may be searched for and thus determined.

The technical resource may be a communication resource, e.g. the ability of the object to communicate by means of a network such as a wireless network (WiFi, Bluetooth™, LiFi, etc.) or a wired network.

The technical resource may be a software resource, such as a web browser, software, an application, etc.

The technical resource may be a hardware resource, e.g. a screen, a microphone, a camera, a loudspeaker, etc.

The technical resource may be an interactive resource, e.g. a mouse, a keyboard, a touch screen, etc.

In addition, the resource access means is a means enabling a resource utilization service to use the resource, typically an IP address of the object including the resource and a port number associated with the resource, that may for example enable a stream to be recovered from the resource. The access means may also include a proprietary security code, which code serves to limit access to the resource to objects that are authorized.

When the resource search module 333 detects a technical resource together with resource access means, the second object 310 can send (substep S618) a message M4 to the server 315, the message M4 indicating that a technical resource of the second object 310 and access means to that resource have been detected, and also that the technical resource can be used by the user.

By way of example, the message M4 may be sent in real time. The message M4 may include an identifier of the second object 310, an identifier of the resource, an identifier of the access means, and may also include one or more pieces of information relating to the resource in order to describe the resource. In the example when the resource is a screen, the message M4 may thus include information about the size of the screen and information about the resolution of the screen.

The message M4 may also include a request for connection to the server 315, e.g. requesting the opening of a data exchange channel with the server 315.

In an example, an application of a second object 310 of the mobile telephone type enables a camera of the mobile telephone to be transformed into an IP camera. The message M4 may then include the identifier of the camera, the identifier of the mobile telephone, together with the IP address of the telephone, the port number of the camera, and a proprietary security code. Thus, a first object 305, e.g. a laptop computer, connecting to the server 315 with the same connection process and the same proprietary security code can use the camera of the mobile telephone as an IP camera.

The management module 341 of the server 315 then acts in a substep S620 to update the list 340 corresponding to the extended workstation by associating the identifier of the second object 310, the identifier of the resource, the identifier of the access means, and optionally information about the resource.

The substep S620 is thus a step of storing in a server an identifier of the determined technical resource in association with an identifier of the second object 310 and an identifier of said means giving access to said resource.

In addition, the data exchange channel may be set up between the second object 310 and the server 315.

One or more first objects 305 may also implement a substep S616 of searching for technical resources, in order to search for one or more of their technical resources. The substep S616 of searching for a technical resource can thus be performed by a resource search module of the first object, e.g. the resource search module 333 of the first object 305 in FIG. 3.

Thus, the substeps S616, S618, and S620 make it possible in real time to have knowledge about one or more resources in one or more second objects 310 of the extended workstation, and possibly about one or more resources of one or more first objects 305 of the extended workstation. These resources are then suitable for being used by the user.

When the system 300 does not include a server, the message M4 of substep S618 is sent to a first object 305 and the substep S620 is not performed. A management module 341 of the first object 305 updates the list 340 as a function of the data in the received message M4.

For at least one object 305, 310 of the extended workstation, the step S510 may include a substep (not shown) of associating the object with at least one technical resource and with at least one means giving access to the resource. This substep of associating is additional to the substep S616 of searching for or it replaces the substep S616 of searching for.

The substep of associating consists in creating a link between the identifier of an object and the identifier of one or more resources, as a function of the type of the object.

For example, for a given smartphone type, the interaction capacities (e.g. touch screen, etc.), the communication capacities (Bluetooth™, WiFi, etc.), and the hardware capacities (e.g. screen, microphone, loudspeaker, etc.) are known. The access means are also known.

The management module 341 of the server 315 updates the list 340 on the basis of its knowledge by creating a link between the first object 305 or the second object 310 with the technical resource and the access means.

FIG. 11 schematically represents an example of the list 340 after the step S520 of storing. FIG. 12 schematically represents an example of a portion of the list 340 after the step S520 of storing.

In a step S530, a technical resource is used by the first object 305 via the resource access means. One or more first objects 305 can each perform such a step S530 of using. The first object 305 may also use its own technical resources.

More precisely, in a substep S622, a first object, e.g. the first object 305 of FIG. 3, receives a command to use a service issued by the user of the first object 305. The service includes at least one function.

By way of example, the service is a video conference service, with the utilization command being to open an application dedicated to said service. By way of example, the functions of the video conference service comprise picking up a sound or an image, or playing back a sound or an image.

Thereafter, the first object 305 sends (substep S624) to the server 315 a request R2 for transmission of the list 340. The server 315 then sends the list 340 in a message M5 (substep S626).

In an example, the transmission request R2 includes a proprietary security code. Thereafter, the server 315 uses the message M5 to send the associations of resources having access means including a proprietary security code corresponding to the proprietary security code sent in the request R2.

The first object 305 can then display the list 340 in order to inform a user about the objects 305, 310 and the resources that are available in the list 340. The list 340 may be presented in the form of a matrix having the objects of the extended workstation along one side and, for each object, the detected resources along another side. A map, i.e. a table associating the list of available resources and the list of those functions may be proposed in order to optimize and enrich the user's experience. The invention also serves to create an entity network around the user, each entity potentially being a zone, an object, a content, or some other person (specifically an object belonging to another user can be used if that other user authorizes such use). The entity network may be generalized and used for other purposes, such as augmented interactions with the surrounding entities.

Thus, a content may be shared between a plurality of users present in a room by using one of the available resources. For example, a document, such as a document relating to the meeting for which the meeting room was reserved, or a notice present and referenced in a zone, can be shared by using the most appropriate screen in the meeting room or the zone.

When the system does not include a server, the substeps S624 and S626 are not performed, since the list 340 is already available to a first object 305.

The recommendation module 334 of the first object 305 can then act in a substep S628 to recommend at least one of the resources determined in step S510. In an example, for each function of the service, the recommendation module 334 of the first object 305 recommends a resource. This recommendation, which is particularly advantageous when a plurality of resources of the same type have been determined in step S510, may be drawn up as a function of the need of the service and of the context in which the service is used, such that it is the resource that is best adapted to the function that is used.

FIG. 13 schematically represents an example of classification for a plurality of types of resources determined in step S510 ("screen", "mike", "touch", and "voice"), of the resources of the objects 305, 310 of the extended workstation. As can be seen in FIG. 10, the classification may be performed as a function of information about the resources as transmitted in the message M4. Thus, for the resource of "screen" type, the screen of the laptop computer, which is of large size and high resolution, is classified ahead of the screen of the mobile telephone, which is of small size, while the screen of the mobile telephone is classified ahead of the screen of the smartwatch, since that screen is of very small size.

In a substep S630, at least one technical resource is selected, e.g. by the user or by a selector module 335 of the first object 305. The user may follow the recommendation of the recommendation module 334, or ignore it.

The first object 305 then acts in a substep S632 to send to the server 315 a request R3 for reserving the selected resource.

In a variant, the substeps S624, S626, S628, S630, and S632 are not performed, the first object 305 sends a utilization request to the server 315 and the server 315 selects one or more technical resources.

The server 315 updates the list 340 in order to indicate that the resource has been selected (substep S634). The server 315 may also send, in a substep S636, a message M6 to the second object 310 in order to inform the second object 310 that the resource has been reserved, and optionally a message to the first object 305 in order to inform the first object 305 that the resource of the second object 310 has been reserved.

When the system does not include a server, the substeps S632, S634, and S636 are not performed. Since the list 340 is already available to a first object 305, the first object 305 updates the list 340 in order to indicate that the resource has been selected, and then sends a message to the second object 310 in order to inform the second object 310 that the resource has been reserved.

In a substep S638, the utilization module 336 of the first object 305 uses the selected technical resource via the resource access means.

The utilization module 336 is a software module of the first object 305 containing all of the service logic associated with the selected resource of the second object 310, in other words the various operations performed by the first object 305 for managing the selected resource of the second object 310.

The utilization module 336 is adapted to the first object 305 and more particularly to its execution environment and to the languages that it supports. The utilization module 336 is thus programmed to execute by calling the primitives of the execution environment of the first object 305 while making use of the resource of the second object 310 via the resource access means.

In an example, the utilization module 336 uses software of the second object 310, or a touch screen of the second object 310, the touch screen serving to interact with other resources of the service.

In an example, the resource is used by the utilization module 336 in secure manner. For example a password may be requested.

In a variant, the first object 305 or the server 315 puts a service platform, e.g. the service platform 320 of FIG. 2, into communication with the selected technical resource.

More precisely, the first object 305 uses a message M7 to send a list of selected resources to the service platform 320, the list including at least one selected resource (substep S640). In a variant, the server 315 sends the list of selected resources to the service platform 320.

Thereafter, in a substep S642, the service platform 320 uses the selected resource via the resource access means.

When the disconnection module 337 of the first object 305 receives a command to disconnect the service (substep S644), e.g. when the user closes the application dedicated to the service, the disconnection module 337 acts in a substep S646 to send a request R4 to the server 315 for cancelling the reservation of the resource. The server 315 updates the list 340 in order to indicate that the resource is no longer selected (substep S648).

Furthermore, when the disconnection module 337 detects a malfunction (substep S650), the disconnection module 337 acts in a substep S652 to send a request R5 to the server 315 for cancelling the reservation of the resource, which request may also be a request to reserve another resource. The server 315 updates the list 340 to indicate that the resource is no longer selected and possibly also to indicate that the other resource has been selected (substep S654).

When the system 100 does not include a server, the substeps S646 and S648 or S650 and S652 are not performed and it is the management module 341 of the first object 305 that updates the list 340.

Figure 14:
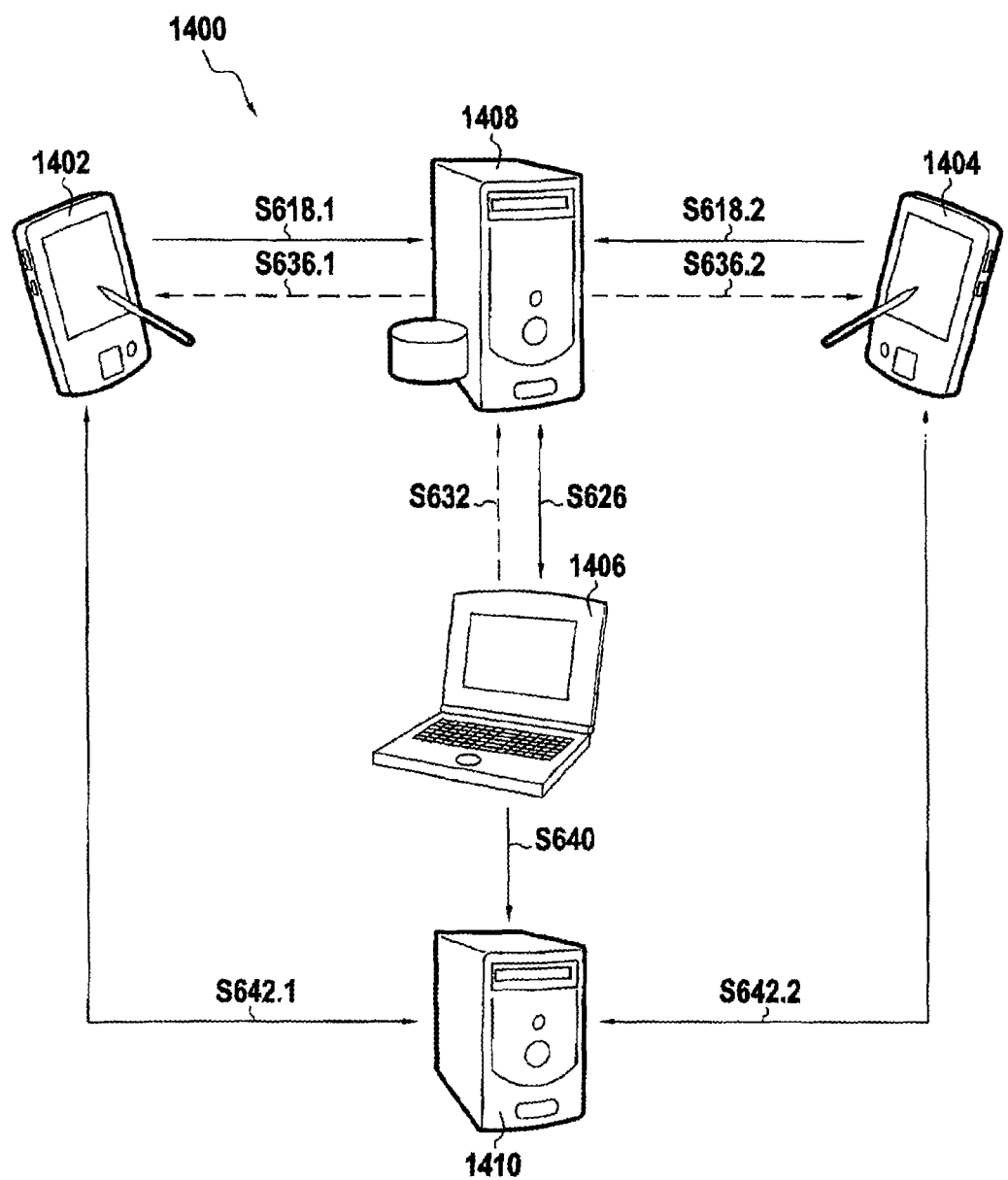
FIG. 14 schematically represents a system for using an extended workstation in an embodiment of the invention.

FIG. 14 schematically represents a system 1400 for using an extended workstation in an embodiment of the invention.

In this embodiment, the system 1400 includes a mobile telephone 1402 of the smartphone type, another mobile telephone 1404 of the smartphone type, a personal computer 1406, a server 1408, and a conference platform 1410.

After the step S500 of determining the mobile telephone 1402, the other mobile telephone 1404, and the personal computer 1406, each mobile telephone 1402, 1404 determines that it includes as resources a microphone and a camera (substeps S616 of step S510 of determining a technical resource). These technical resources and their access means are sent to the server 1408 in substeps S618.1 and S618.2.

The server 1408 then stores (step S520) an identifier of each microphone and camera in association with the associated mobile telephone 1402, 1404.

In a step S530 of using, the personal computer 1406 recovers the information stored by the server 1408 (substep S626).

Thereafter, the personal computer 1406 acts in a substep S632 to send to the server 1408 a reservation request indicating that the microphone of the mobile telephone 1402 and the camera of the other mobile telephone 1404 are selected.

The server 1408 then sends a message to the mobile telephone 1402 in order to inform it that its microphone has been reserved (substep S636.1) and a message to the other mobile telephone 1404 to inform it that its camera has been reserved (substep S636.2).

The personal computer 1406 then sends a list of selected resources to the service platform 1410, the list thus including the microphone of the mobile telephone 1402 and the camera of the mobile telephone 1404 (substep S640).

The service platform 1410 then acts in a substep S642.1 to make use of the microphone of the mobile telephone 1402 via the access means giving access to the microphone, and acts in a substep S642.2 to make use of the camera of the mobile telephone 1404 via the access means giving access to the camera.

Figure 15:
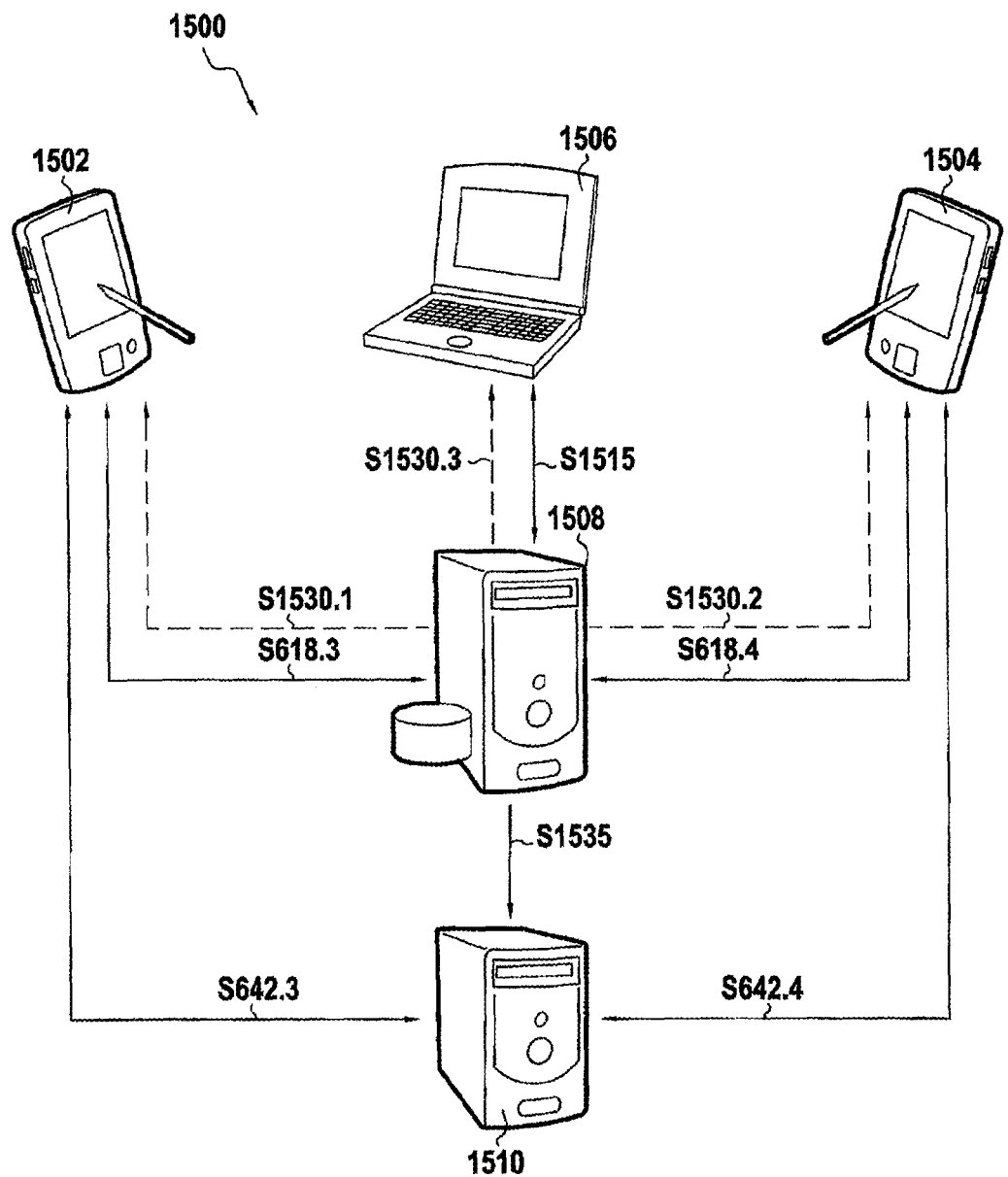
FIG. 15 schematically represents a system for using an extended workstation in an embodiment of the invention.

FIG. 15 schematically represents a system 1500 for using an extended workstation in an embodiment of the invention.

In this example, the system 1500 includes a mobile telephone 1502 of the smartphone type, another mobile telephone 1504 of the smartphone type, a personal computer 1506, a server 1508, and a conference platform 1510.

After the step S500 of determining the mobile telephone 1502, the other mobile telephone 1504, and the personal computer 1506, each mobile telephone 1502, 1504 determines that it includes as resources a microphone and a camera (substeps S616 of step S510 of determining a technical resource). The personal computer 1506 may also send its own available resources. These technical resources, together with their access means, are sent to the server 1508 in substeps S618.3 and S618.4.

The server 1508 then acts in a step S520 to store an identifier of each microphone and camera in association with the associated mobile telephone 1502, 1504.

In a step S530 of using, the personal computer 1506 acts in a substep S1515 to send to the server 1508 a utilization request in the form of a command for connection to the platform 1510. The server 1508 then selects the microphone of the mobile telephone 1502 and the camera of the mobile telephone 1504 as resources.

The server 1508 then acts in a substep S1530.1 to send a message to the mobile telephone 1502 to inform it that its microphone has been reserved, and acts in a substep 1530.2 to send a message to the mobile telephone 1504 to inform it that its camera has been reserved. The server 1508 also acts in a substep S1530.3 to send a message to the personal computer 1506 to inform it that the microphone of the mobile telephone 1502 and the camera of the other mobile telephone 1504 have been reserved.

Thereafter, after opening the connection to the service platform 1510, the server 1508 sends a list of the selected resources to the service platform 1510, the list thus including the microphone of the mobile telephone 1502 and the camera of the mobile telephone 1504 (substep S1535).

Thereafter, in a substep S642.3, the service platform 1510 uses the microphone of the mobile telephone 1502 via the access means giving access to that microphone, and in a substep S642.4, uses the camera of the mobile telephone 1504 via the access means giving access to that camera.

The invention claimed is:

1. A method for using an extended workstation as part of a service, the method comprising:
a step of determining a first object and a second object that are connected via at least one communication network and are suitable for being used by a user, the extended workstation comprising each object determined during the step of determining the first object and the second object, a list corresponding to the extended workstation being created or updated with an identifier of the first object and an identifier of the second object;
a step of determining, by the second object, a technical resource of the second object and of determining an access giving access to said resource enabling said resource to be remotely used, the access to said resource comprising an IP address of the second object including the technical resource and a port number associated with the technical resource;
a step of storing in a server, which is connected with the at least one communication network or connected with the first and second objects via another communication network, an identifier of the determined technical resource in association with the identifier of the second object and with an identifier of said access for accessing said resource, by updating the list corresponding to the extended workstation by associating the identifier of the second object, the identifier of the resource and the identifier of the access;
a step of receiving, by the first object, a command issued by the user to use the service, the service being installed only on the first object and the service requiring at least one function among picking up sound, capturing images, playing back sound and playing back images;
a step of receiving, by the first object, the list corresponding to the extended workstation, the list including a plurality of resources of a same type for implementing a function of the service;
a step of recommending, by the first object and to the user, a technical resource for implementing said function of the service, based on a need of the service and of a context in which the service is used; and
a step of using the recommended technical resource by the first object, via the access giving access to said resource.

2. The method according to claim 1, wherein the step of determining the first object and the second object comprises at least one of:
a substep of detecting activity of the first object;
a substep of detecting activity of the second object.

3. The method according to claim 1, wherein the step of determining the first object and the second object comprises at least one of:
a substep of detecting entry of the first object into a predefined zone, the first object then being determined as being an object suitable for being used by a user;
a substep of detecting entry of the second object into a predefined zone, the second object then being determined as being an object suitable for being used by a user.

4. The method according to claim 1, wherein the step of determining the first object and the second object comprises at least one of:
a substep of detecting the second object by said first object, said second object then being determined as being an object suitable for being used by a user;
a substep of detecting the first object by the second object, said first object then being determined as being an object suitable for being used by a user.

5. The method according to claim 1, wherein the step of determining a technical resource of the second object includes a substep of searching for a technical resource by the second object.

6. The method according to claim 1, wherein the technical resource is:
a communication resource;
a software resource;
a hardware resource; or
an interaction resource.

7. The method according to claim 1, wherein the step of using comprises:
a substep of selecting the determined technical resource.

8. The method according to claim 7, wherein the step of using comprises a substep of associating a service platform with said selected technical resource.

9. A system for using an extended workstation as part of a service, the system comprising:
a plurality of processors; and a plurality of non-transitory computer-readable mediums comprising instructions stored thereon, which when executed by the plurality of processors configure the system to perform acts comprising:

determining a first object and a second object that are connected via at least one communication network and are suitable for being used by a user, the extended workstation comprising each object determined during the step of determining the first object and the second object, a list corresponding to the extended workstation being created or updated with an identifier of the first object and an identifier of the second object;

determining, by the second object, a technical resource of the second object and of determining an access giving access to said resource enabling said resource to be remotely used, the access to said resource comprising an IP address of the second object including the technical resource and a port number associated with the technical resource;

storing in a server, which is connected with the at least one communication network or connected with the first and second objects via another communication network, an identifier of the determined technical resource in association with an identifier of the second object and with an identifier of said access for accessing said resource, by updating the list corresponding to the extended workstation by associating the identifier of the second object, the identifier of the resource and the identifier of the access;

receiving, by the first object, a command issued by the user to use the service, the service being installed only on the first object and the service requiring at least one function among picking up sound, capturing images, playing back sound and playing back images;

receiving, by the first object, the list corresponding to the extended workstation, the list including a plurality of resources of a same type for implementing a function of the service;

recommending, by the first object and to the user, a technical resource for implementing said function of the service, based on a need of the service and of a context in which the service is used; and using the recommended technical resource by the first object via the access giving access to said resource.

10. A plurality of non-transitory computer readable data mediums storing instructions for executing a method for using an extended workstation as part of a service, when the instructions are executed by a plurality of processors, the method comprising:

determining a first object and a second object that are connected via at least one communication network and are suitable for being used by a user, the extended workstation comprising each object determined during the step of determining the first object and the second object, a list corresponding to the extended workstation being created or updated with an identifier of the first object and an identifier of the second object;

determining, by the second object, a technical resource of the second object and of determining an access giving access to said resource enabling said resource to be remotely used, the access to said resource comprising an IP address of the second object including the technical resource and a port number associated with the technical resource;

storing in a server, which is connected with the at least one communication network or connected with the first and second objects via another communication network, an identifier of the determined technical resource in association with an identifier of the second object and with an identifier of said access for accessing said resource, by updating the list corresponding to the extended workstation by associating the identifier of the second object, the identifier of the resource and the identifier of the access;

receiving, by the first object, a command issued by the user to use the service, the service being installed only on the first object and the service requiring at least one function among picking up sound, capturing images, playing back sound and playing back images;

receiving, by the first object, the list corresponding to the extended workstation, the list including a plurality of resources of a same type for implementing a function of the service;

recommending, by the first object and to the user, a technical resource for implementing said function of the service, based on a need of the service and of a context in which the service is used; and using the recommended technical resource by the first object via the access giving access to said resource.

11. The method according to claim 1, further comprising:

sending a request to the server for reserving the recommended technical resource, previously to using said technical resource;

detecting, by the first object, a malfunction of the reserved technical resource used by the first object; and, sending by the first object a request to the server to cancel reservation of the malfunctioned technical resource.

12. The method according to claim 1, wherein the received list comprises displays having different resolutions and sizes and microphones having different pickup features.

13. The method according to claim 1, further comprising displaying, by the first object, the list to inform a user about the objects and the resources that are available in the list, the list being presented in the form of a matrix having the objects of the extended workstation along one side and, for each object, the detected resources along another side.

* * * * *